United States Patent
Kumar et al.

(10) Patent No.: US 7,292,855 B2
(45) Date of Patent: Nov. 6, 2007

(54) APPARATUS, AND ASSOCIATED METHOD, FOR FACILITATING FORMATION OF MULTIPLE MOBILE IP DATA SESSIONS AT A MOBILE NODE

(75) Inventors: Krishna Kumar, San Diego, CA (US); Chris Kunard, San Diego, CA (US)

(73) Assignee: Nokia Corporation, Espoo (FI)

( * ) Notice: Subject to any disclaimer, the term of this patent is extended or adjusted under 35 U.S.C. 154(b) by 405 days.

(21) Appl. No.: 10/722,111

(22) Filed: Nov. 25, 2003

(65) Prior Publication Data

US 2005/0111457 A1   May 26, 2005

(51) Int. Cl.
*H04Q 7/20* (2006.01)
(52) U.S. Cl. .............................. 455/435.1; 455/426.1; 709/228; 370/328
(58) Field of Classification Search ................ 455/436, 455/439, 438, 435.1, 419, 426.1, 414.1; 370/331, 370/355, 349, 352, 389, 410, 328; 709/228
See application file for complete search history.

(56) References Cited

U.S. PATENT DOCUMENTS

| | | | |
|---|---|---|---|
| 6,229,806 B1 * | 5/2001 | Lockhart et al. ............ 370/389 |
| 2004/0151186 A1 * | 8/2004 | Akama .................... 370/395.3 |
| 2004/0209614 A1 * | 10/2004 | Bright et al. ............ 455/426.1 |
| 2004/0255030 A1 * | 12/2004 | Sillanpaa .................... 709/228 |

* cited by examiner

Primary Examiner—Joy K. Contee
(74) Attorney, Agent, or Firm—Alston & Bird LLP

(57) ABSTRACT

Apparatus, and an associated method, for facilitating concurrent effectuation of more than one packet data communication session at a mobile node. Both a normal packet data communication session and, for instance, an IOTA provisioning session are concurrently performed. A second packet data session initiator initiates the communication session through generation of a registration request. A communication session is formed, and a communicator communicates pursuant to the communication session, concurrent with performance of the first packet data communication session. Because both communication sessions are concurrently performable, one or the other of the communication sessions need not be terminated to permit the other of the communication sessions to be performed.

20 Claims, 3 Drawing Sheets

APPARATUS, AND ASSOCIATED METHOD, FOR FACILITATING FORMATION OF MULTIPLE MOBILE IP DATA SESSIONS AT A MOBILE NODE

The present invention relates generally to a manner by which to permit more than one data session to be performed concurrently at a mobile node operable in a cellular, or other radio, communication system. More particularly, the present invention relates to apparatus, and an associated method, by which to permit an IOTA (Internet Over The Air) provisioning, or other IP-data, session to be performed concurrent with another data session.

By providing for multiple data sessions to be ongoing concurrently at the mobile node, a primary data session need not be interrupted to permit a secondary data session to be carried out. When, e.g., the secondary data session forms an IOTA provisioning session, the IOTA provisioning session is carried out in a manner transparent to a user of the mobile node. That is to say, the IOTA provisioning session is carried out without interruption to the primary data session. And, the user need not be aware of the IOTA provisioning session. Once the provisioning objects are delivered to the mobile node during the provisioning session, the provisioning session ends. The objects are later used pursuant to a subsequent IOTA session.

BACKGROUND OF THE INVENTION

Advancements in communication technologies have permitted the development, deployment, and popular usage of new types of communication systems. Amongst such advancements are advancements that permit the communication of communication data at increased throughput rates and in manners that facilitate recovery of the informational content of the data when communicated in non-ideal communication conditions. Due to the implementation of such advancements, new types of communication services are, and shall likely continue to become, available.

A radio communication system is exemplary of a type of communication system that has benefited through the adoption of advancements in communication technologies. In a radio communication system, at least a portion of a communication path upon which communication data is communicated to effectuate a communication service is formed upon a radio link. Radio channels are defined upon the radio link, and the communication data is communicated upon the radio channels.

When radio channels are used upon which to communicate communication data, the need otherwise to utilize a wireline upon which to form communication channels is obviated. Because a wireline connection is not required to interconnect communication stations that form parties to a communication session in which a communication service is effectuated, the communication service is effectuable between locations at which the formation of wireline connections would be inconvenient or impractical. That is to say, through use of a radio communication system, a communication service is able to be effectuated even though effectuation of the communication service would be impractical or unfeasible by way of a conventional, wireline communication system.

Amongst the advancements in communication technologies are advancements in digital communication techniques. Digital communication techniques are utilized in radio, as well as other types of, communication systems. Digital communication techniques, in general, permit the efficiency by which communication data is communicated relative to communications effectuated through the use of conventional, analog communication techniques. In a digital communication technique, information that is to be communicated is digitized. And, typically, once digitized, the data is formatted into packets, or frames, according to a selected data formatting protocol. The data packets are communicated between a set of communication stations forming communication source and communication destination nodes. Once delivered to the destination node, the informational content of the communication data is recovered.

Communication services that are effectuated by way of the World Wide Web (www) typically communicate packet-formatted communication data. Content retrieval, as well as other communication services, are regularly effectuated between a content provider and a recipient station, typically a computer terminal, by way of the World Wide Web. Conventionally, the computer terminal and the content provider are connected by way of wireline connections with a packet data network, e.g., the Internet, backbone.

Protocols have been promulgated and standardized that relate to packet-based communications. The Internet Protocol (IP) is an exemplary packet-formatting protocol. The Internet Protocol is typically implemented at a link layer in communication systems. Standards relating to the Internet Protocol include, e.g., the IPv4 and IPv6 versions. In these versions of the Internet Protocol, operational parameters as well as the logical configuration of the IP network are set forth.

Increasingly, packet-based communications, including communication services that are effectuated by way of the World Wide Web, utilize mobile nodes as source or destination nodes. The prefix identifying the mobile node does not necessarily, and regularly does not, identify the location at which the mobile node is positioned. While the mobility of the mobile node is generally advantageous, unique problems associated with such mobility require special entities to be defined and special procedures to be carried out. For instance, home agents and care of (c/o) addresses are defined.

Data packets that are to be delivered to a mobile node are generally addressed to the home agent associated with the mobile node. However, due to the mobility of a mobile node, the mobile node might not be in an area that the home agent encompasses. Through the use of a care of address, the data packet delivered to a home agent is rerouted to be delivered to an area in which the mobile node is located. That is to say, a home agent identifies a home address, i.e., a home sub-network, associated with the mobile node. And, the care of address identifies a temporary, or visited, location of the mobile node. When packet data is to be communicated to the mobile node, the packet data is addressed, and routed to, the home agent of the mobile node. The home agent is provided with the identity of the care of address of the mobile node, and the packet data is re-routable to the care of address and the mobile node located in a visited network associated therewith.

Mobile IP (Internet Protocol) functionality is provided in some cellular communication systems. And, deployment of such functionality is anticipated in others. Mobile IP refers generally to a protocol that provides roaming capability to a mobile node during a data communication session, i.e., a data connection, as a mobile node roams between, e.g., separate packet data service nodes (PDSNs). Mobile IP provides IP-level mobility. Pursuant to mobile IP procedures, a mobile node is required to register with a home agent by specifying the address, i.e., the care of address, through which the mobile node can be reached. The home agent becomes responsible for forwarding all packet data destined for the mobile node to the care of address. The care of address forwards the data packets delivered thereto to the mobile node. In a cellular communication system operable pursuant to an existing CDMA (Code-Division, Multiple-Access) operating standard, the packet data service node acts as the care of address. And, the mobile node registers with the home agent by specifying the address of the packet data service node as the care of address.

The network operator of a cellular communication system provisions a mobile node with operator-specific data to facilitate operation of the mobile node in the system operated by the operator. An operating specification, such as the IS-683-B operating specification, defines a protocol by which to provision a mobile node with the operator-specific data. The operating specification defines the various objects that are permitted to be provisioned and the format of the objects as well as the messages that are used by which to provide the mobile node with the objects and data. The actual data or link layer mechanisms by which the messages are exchanged are, however, not specified. Internet Over The Air provisioning (IOTA) is a mechanism by which the IS-683-B, or other appropriate, messages and objects are exchanged over an Internet Protocol data connection. Generally, the IOTA messages are exchanged over an HTTP protocol that, in turn, runs over the TCP/IP (Transport Control Protocol/Internet Protocol) protocol.

Conventional deployment of the Internet Over The Air provisioning schemes require that the Internet Over The Air sessions be initiated on a separate mobile IP profile. That is to say, pursuant to the IOTA scheme, a mobile IP session is required to be set up by the mobile node with a specific home agent for the IOTA scheme and to use the specific mobile IP parameters for the IOTA scheme. The home agent and the mobile IP parameters used pursuant to the IOTA scheme sometimes differ with the home agent and parameters used pursuant to normal data connections to effectuate normal data communication services.

At least one wireless Internet Protocol network standard, the IS-835 standard, permits multiple mobile IP sessions to be performed, i.e., run, over the same time. Each of the sessions is associated with a separate IP endpoint address. Existing configurations, however, permit only one mobile IP session to exist between the mobile node and the network infrastructure of the system.

As multiple, concurrent data sessions are generally not permitted, an IOTA provisioning session is unable to be performed at the same time as a normal data connection used to effectuate a normal communication service. To provision a mobile node with IOTA provisioning information, various use-case scenarios are conventionally used to preempt one session and to start another. These use-case scenarios are generally complicated.

And, because the data sessions cannot run concurrently, an IOTA provisioning session is not transparent to the user of the mobile node. While an IOTA provisioning session is being performed, the user of the mobile node is unable to perform another data service by way of the mobile node. If the user pre-empts the IOTA provisioning session, the provisioning process of the mobile node is delayed. And, the use-cases that would provide for the preempting of a normal data communication session with an IOTA session, or vice-versa, increases the complexity required of the control entities of the mobile node.

What is needed, therefore, is a manner by which to permit concurrent operation of more than one mobile IP data communication sessions at a mobile node. By providing for multiple mobile IP sessions, IOTA provisioning would be performable concurrent with an ongoing data communication session.

It is in light of this background information related to radio communication systems that provide mobile IP functionality that the significant improvements of the present invention have evolved.

SUMMARY OF THE INVENTION

The present invention, accordingly, advantageously provides apparatus, and an associated method, by which to permit more than one data session to be performed concurrently at a mobile node operable in a cellular, or other radio, communication system.

Through operation of an embodiment of the present invention, a manner is provided by which to permit an Internet Over The Air provisioning, or other IP-data, session to be performed concurrent with an ongoing data session.

Running of concurrent data sessions at the mobile node is permitted. For example, a primary data session and a secondary data session are concurrently performed, at least during a selected overlapping time period at the mobile node. A primary data session need not be interrupted to permit the secondary data session to be carried out. When the secondary data session forms an IOTA provisioning session, the IOTA provisioning session is carried out, from the perspective of a user of the mobile node, transparently. In contrast to conventional preemption schemes, the IOTA provisioning session is carried out without interruption to the primary data session.

Provisioning objects are delivered to the mobile node during the IOTA provisioning session. The objects include, for instance, information associated with the IOTA home agent as well as mobile EP parameters associated with an IOTA session. Subsequent to delivery of the provisioning objects to the mobile node, the provisioning session ends in a manner also transparent to the user. The objects are later used pursuant to a subsequent IOTA session.

In one aspect of the present invention, a provisioning session is selected to be initiated. Selection of the initiation of the provisioning session occurs at the mobile node, such as by user actuation of an appropriate actuator at the mobile node to select the initiation of the provisioning session. Or, the selection to initiate the provisioning is externally selected and provided to the mobile node, such as by way of an SMS (Short Message Service) push message.

Initiation of the provisioning, or reprovisioning, session, responsive to the selection to initiate such, occurs irrespective of whether another data communication session is ongoing. When another, i.e., first, data communication session is ongoing, and selection is made to initiate the second packet data communication session, the mobile node is generates a mobile IP registration request to request registration of the mobile node and to form the secondary data communication session.

The registration request is routed to a home agent, here a home agent associated with IOTA provisioning. Responsive to the registration request, a data session is formed, and the IOTA provisioning indicia is provided to the mobile node. The provisioning takes place pursuant to the secondary data communication session while the primary data communication session continues without interruption. When the provisioning is completed, the secondary data communication session is torn down, i.e., ends. And, when a subsequent IOTA session is to be formed, the provisioning indicia is used to form, and otherwise carry out an IOTA communication session.

Because the separate data communication sessions are performed concurrently and do not require the termination of, or interruption of, an ongoing data session to form an IOTA provisioning session, improved user acceptability of a mobile node is provided. Additionally, during the performance of IOTA provisioning, a separate data communication session is, if desired, initiated without need to interrupt the IOTA provisioning session.

In these and other aspects, therefore, apparatus, and an associated method, is provided for a packet radio communication system that provides for roaming operation of a mobile node during a first packet data communication session. Creation of a second packet data communication session is facilitated at least during a selected time interval concurrent with the first packet data communication session. A second-session initiator is at least selectably operable at least during the first packet data communication session to initiate the creation of the second packet data communication session. The second-session initiator initiates the second packet data communication session with a registration request that requests registration of the mobile node to communicate pursuant to the second packet data communication session. A second-session data communicator is also at least selectably operable at least during the first packet data communication session and subsequent to registration of the mobile node, requested by the second session initiator. The second session data communicator communicates second session packet data pursuant to the second packet data communication session at least during the selected time interval concurrent with the first packet data communication session.

A more complete appreciation of the present invention and the scope thereof can be obtained from the accompanying drawings that are briefly summarized below, the following detailed description of the presently-preferred embodiments of the present invention, and the appended claims.

DETAILED DESCRIPTION

Figure 1:
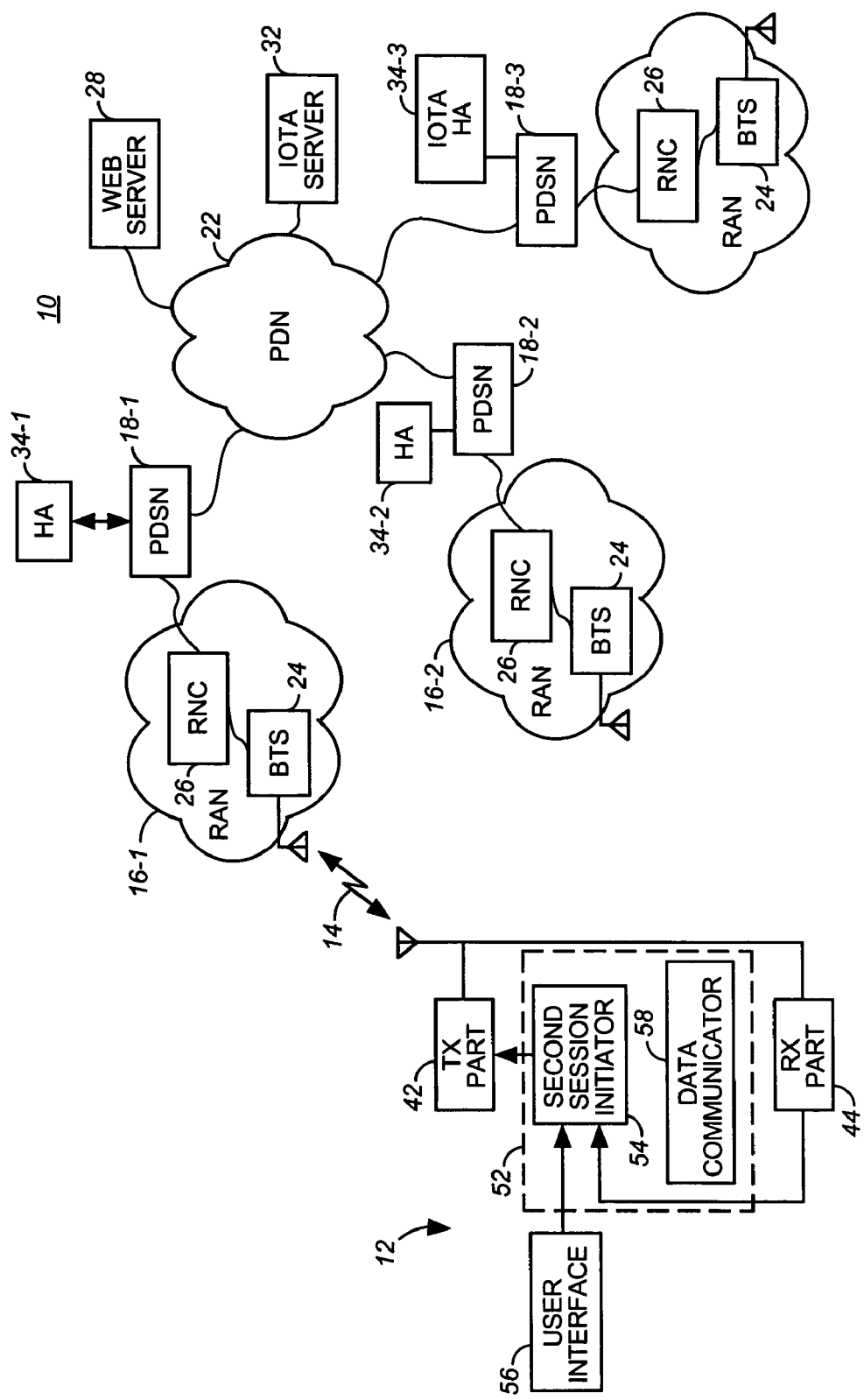
FIG. 1 illustrates a functional block diagram of a packet radio communication system in which an embodiment of the present invention is operable.

Referring first to FIG. 1, a packet radio communication system, shown generally at 10, provides for packet radio communications to effectuate a communication service with mobile nodes, of which the mobile node 12 is representative. In the exemplary implementation, the communication system forms a new generation, cellular communication system, such as a cellular communication system that operates pursuant to a code-division, multiple-access communication scheme. While the following description shall describe exemplary operation of an embodiment of the present invention with respect to its implementation in such a cellular communication system, the teachings of the present invention analogously also are implementable in other types of cellular, as well as other radio, communication systems. And, operation of an embodiment of the present invention can analogously be described with respect to its implementation in such other communication systems.

The mobile node communicates by way of radio channels, here represented by the arrow 14, defined upon a radio air interface formed between the mobile node and a network part of the communication system. Forward link channels and reverse link channels are defined upon the radio air interface, and packet-formatted data is communicated thereon to effectuate a communication service.

The network part is here shown to be formed of radio access networks (RANs) 16. Three separate radio access networks, networks 16-1, 16-2, and 16-3 are shown. The radio access networks are coupled, by way of associated packet data service nodes (PDSNs) 18 to a packet data network (PDN) 22. That is to say, the radio access network 16-1 is connected by way of an associated packet data service node 18-1 to the packet data network. The radio access network 16-2 is coupled by way of an associated packet data service node 18-2 to the packet data network, and the radio access network 16-3 is coupled by way of a packet data service node 18-3 to the packet data network.

The radio access network 16-1 is further shown to include a base transceiver station (BTS) 24 and a radio network controller (RNC) 26. Others of the radio access networks comprise analogous structure.

While only a single base transceiver station 24 is shown in each of the radio access networks, an actual radio access network typically includes a plurality of base transceiver stations located at spaced-apart positions. Each base transceiver station includes transceiver circuitry capable of sending, and receiving, packet-formatted data when a mobile node, such as the mobile node 12, is positioned within communication range of a base transceiver station. The radio network controllers are typically coupled to a group of base transceiver stations and operate, amongst other things, to control operation of the associated base transceiver stations.

Functional, and other, communication entities are coupled to the packet data network. Here, a web server 28 and an Internet Over The Air (IOTA) 32 are shown to be coupled to the packet data network. The servers 28 and 32 each form content sources at which content to be delivered to the mobile node is sourced.

Each mobile node is associated with a home agent (HA). Here, for purposes of example, the home agent 34-2 is the home agent of the mobile node 12. In the exemplary implementation, home agents are embodied at the packet data service nodes 18. When a data packet is sourced, such as at the Web server 28, for communication to the mobile node, the data packet is addressed to the packet data service node at which the home agent associated with the mobile node is embodied. Due to the roaming capability of the mobile node, the mobile node might not, and in the exemplary positioning shown in the figure, is not, positioned to be in communication connectivity with a base transceiver station of the radio access network coupled to the packet data service node to which the data packet is addressed. To permit routing of the data packet to the appropriate radio access network, the mobile node provides its home agent with a care of address of the network, e.g., the packet data service node associated therewith. When the data packet is delivered to the packet data service node at which the home agent associated with the mobile node is embodied, the care of address is ascertained. Then, the data packet is forwarded on to the care of address for subsequent delivery to the mobile node.

Also as noted previously, IOTA (Internet Over The Air) data services are also available for effectuation with a mobile node. Data packet routing during roaming operation of the mobile node is performed analogous to the procedure just-described, i.e., with respect to delivery of a data packet to a home agent and forwarding of the data packet to a care of address. The IOTA home agent, however, is not necessarily embodied at the same packet data service node as the home agent associated with the mobile node for normal data communications. Here, the dissimilarity is indicated in that the home agent 34-2 of the mobile node for normal data communication services is embodied at the packet data service node 18-2 while the IOTA home agent associated with the mobile node is embodied at the packet data service node 18-3.

The mobile node includes transceiver circuitry, here represented to include a transmit part 42 and a receive part 44. The transceiver circuitry operates to send and to receive packet-formatted data pursuant to data communication sessions to permit effectuation of data communication services. An exemplary data communication service is a data service in which data sourced at the Web server 28 is provided to the mobile node. Another exemplary service is an IOTA service, such as that provided by the IOTA server 32. Effectuation of an IOTA service requires that provisioning indicia be known to the mobile node. The provisioning indicia is provided to the mobile node pursuant to an IOTA provisioning session. However, also as noted previously, a mobile node is able to maintain only a single data communication session at a time. If a data communication session, a primary data communication session, is ongoing when an IOTA provisioning session, or other secondary data communication session, is to commence, the primary data communication session must generally be interrupted to permit the secondary data communication session to be performed. Also, if the IOTA provisioning session is ongoing, and a user of the mobile node elects to commence a normal data communication service, effectuation of the normal data communication service must generally be delayed until the provisioning session is completed.

The mobile node includes apparatus 52 of an embodiment of the present invention that facilitates initiation of formation of concurrent data communication sessions at the mobile node. The apparatus is functionally represented, and the functional entities that together form the apparatus are formed in any desired manner, such as by algorithms executable by processing circuitry.

Here, the apparatus 52 includes a second session initiator 54 that initiates the second packet data communication session. The initiation of the second packet data communication session commences, e.g., responsive to user selection, entered by way of actuation of appropriate actuation keys of the user interface. Alternately, the initiator operates responsive to an externally-generated request, such as an SMS (Short Message Service) push message sent by the network part of the communication system to the mobile node. Such a message is detected at the receive part, and indications thereof are provided to the initiator 54. The second session initiator creates, or causes creation of, a registration request that is transmitted by the transmit part of the mobile node to the network part of the communication system. Once delivered to the network part, the request is routed through the network part to be delivered to the IOTA server. The IOTA server generates a response, and appropriate steps are carried out to form the second packet data communication session.

The apparatus 52 further includes a second session data communicator 58. The data communicator 58 operates during the secondary packet data session, e.g., to operate upon data packets received during the secondary packet data communication session and to form, or cause formation of, data packets that are communicated during the secondary packet data communication session. When the secondary packet data communication session forms the IOTA provisioning session, provisioning indicia is provided to the mobile node, and the communicator operates upon, and, e.g., stores the provisioning indicia at the mobile node for subsequent retrieval and usage during subsequent IOTA communication sessions. The provisioning indicia includes, e.g., the IP address of the IOTA server, user identification and password values, etc. The functions carried out by the initiator and communicator are carried out irrespective of whether another packet data communication session is ongoing at the mobile node. And, during an IOTA provisioning session, if the user of the mobile node initiates another data communication session, the additional data communication session is not delayed due to the ongoing IOTA provisioning session. Improved user acceptance of the mobile node therefore is provided through operation of the apparatus 52.

Figure 2:
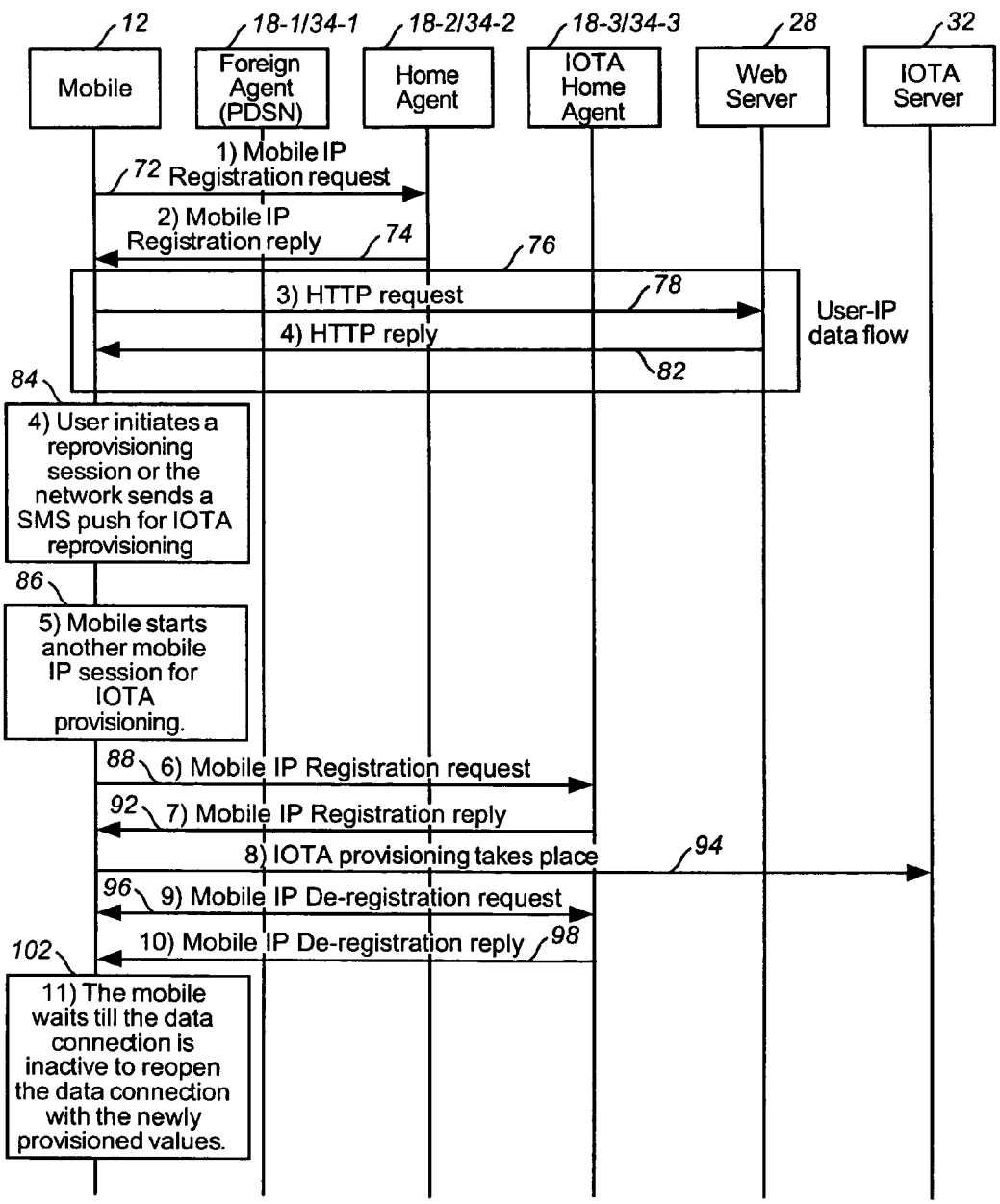
FIG. 2 illustrates a message sequence diagram representative of signaling generated during exemplary operation of the radio communication system shown in FIG. 1 pursuant to operation of an embodiment of the present invention.

FIG. 2 illustrates a message sequence diagram, shown generally at 68, representative of signaling generated during operation of the communication system shown in FIG. 1 pursuant to which an embodiment of the present invention is operable. In this representation, the mobile node is positioned to communicate by way of the radio access network 16-1 (shown in FIG. 1) and the packet data service node 18-1 is the location at which the foreign agent 34-1 is embodied. And, the home agent 34-2 of the mobile node is embodied at the packet data service node 18-2.

To create a primary packet data session, the mobile node generates a mobile IP registration request, indicated by the segment 72, that is sent by the mobile node, over the radio air interface, to the packet data service node 18-1 and further routed to the home agent 34-2. A response is returned, indicated by the segment 74, to the mobile node, and a primary packet data communication session ensues, indicated by the block 76, and, here, with the Web server 28. HTTP requests and replies, indicated by the segments 78 and 82, are communicated pursuant to the primary data communication session.

While the primary data communication session is ongoing, a secondary packet data communication session, here an IOTA reprovisioning session, is initiated. The block 84 represents initiation of the session at the mobile node. Initiation is responsive to user selection or responsive to an externally-generated input. Then, and as indicated by the block 84, the additional session is commenced. The mobile node generates and sends, as indicated by the segment 88, a mobile EP registration request that is delivered to the IOTA home agent 34-3, embodied at the packet data service node 18-3. And, responsive thereto, the home agent generates a reply, indicated by the segment 92. And, thereafter, and as indicated by the segment 94, IOTA provisioning is performed between the mobile node and the IOTA server 32. The IOTA provisioning takes place pursuant, here, to the protocols promulgated in the IS-683B operating standard. When the provisioning is completed, the mobile node generates, indicated by the segment 96, a mobile IP deregistration request requesting deregistration of the IOTA provisioning session. The request is routed to the IOTA home agent 34-3, and the home agent generates a reply, indicated by the segment 98, that is returned to the mobile node. Subsequently, and as indicated by the block 102, the mobile node later utilizes the provisioning indicia provided thereto when a subsequent data connection is formed. When the deregistration reply is received at the mobile node, the subsequent connection is not requested until the provisioning data connection, i.e., the secondary data connection, becomes inactive.

Figure 3:
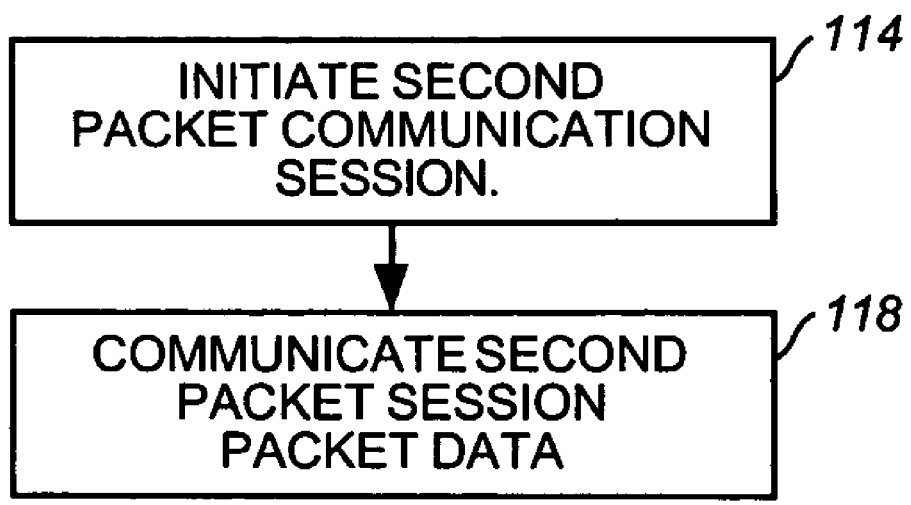
FIG. 3 illustrates a method flow diagram listing the method steps of the method of operation of an embodiment of the present invention.

FIG. 3 illustrates a method flow diagram, shown generally at 112, of the method of operation of an embodiment of the present invention. The method facilitates creation of a second packet data communication session at least during a selected time interval concurrent with a first packet data communication session effectuated with a mobile node.

First, and as indicated by the block 114, the second packet data communication session is initiated, at least during the first packet data communication session. The initiation includes generation of a registration request that requests registration of the mobile node to communicate pursuant to the second packet data communication session. And, as indicated by the block 118, second packet-session packet data is communicated pursuant to the second packet data communication session at least during the selected time interval concurrent with the first packet data communication session.

Because two packet data communication sessions, e.g., a normal packet communication session and an IOTA provisioning session, are performable concurrently, one of the communication sessions need not be terminated or delayed to permit effectuation of the other of the communication sessions.

The previous descriptions are of preferred examples for implementing the invention, and the scope of the invention should not necessarily be limited by this description. The scope of the present invention is defined by the following claims.

The invention claimed is:

1. In a packet radio communication system that provides for roaming operation of a mobile node during a first packet data communication session, an improvement of apparatus for facilitating creation of a second packet data communication session at least during a selected time interval concurrent with the first packet data communication session, said apparatus comprising:
a second-session initiator at least selectably operable at least during the first packet data communication session to initiate the creation of the second packet data communication session, said second-session initiator for initiating the second packet data communication session with a registration request that requests registration of the mobile node to communicate pursuant to the second packet data communication session; and
a second-session data communicator also at least selectably operable at least during the first packet data communication session and subsequent to registration of the mobile node requested by said second-session initiator, said second-session data communicator for communicating second-session packet data pursuant to the second packet data communication session at least during the selected time interval concurrent with the first packet data communication session,
wherein the second-session data communicator is configured to store provisioning indicia at the mobile node in response to establishment of the second packet data communication session, the provisioning indicia including authentication information for use in subsequent initiation of communication pursuant to the second packet data communication session.

2. The apparatus of claim 1 wherein said second-session initiator initiates the creation of the second packet data communication session responsive to a mobile-node-generated input command.

3. The apparatus of claim 1 wherein said second-session initiator initiates the creation of the second packet data communication session responsive to an externally-generated input delivered to the mobile node.

4. The apparatus of claim 3 wherein the externally-generated input comprises a push message delivered to the mobile node.

5. The apparatus of claim 4 wherein the packet radio communication system provides for short message service messaging and wherein the push message responsive to which said second-session initiator initiates the creation of the second packet data communication session comprises a short message service message.

6. The apparatus of claim 1 wherein the second packet data communication session comprises an Internet Over The Air (IOTA) provisioning session and wherein the registration request generated by said second-session initiator requests initiation of the Internet Over The Air provisioning session.

7. The apparatus of claim 6 wherein provisioning indicia is associated with the Internet Over The Air provisioning session and wherein the registration request is generated in accordance with the provisioning indicia.

8. The apparatus of claim 6 wherein provisioning indicia is associated with the Internet Over The Air Internet provisioning session and wherein the registration request is generated to initiate downloading of the provisioning indicia.

9. The apparatus of claim 6 wherein the packet radio communication system further comprises an Internet Over The Air home agent and wherein the registration request generated by said second-session initiator is routed to the Internet Over The Air home agent.

10. The apparatus of claim 9 wherein the second session data communication session comprises an Internet Over The Air provisioning session and wherein said second session data communicator communicates with the Internet Over The Air Home Agent pursuant to the Internet Over The Air provisioning session.

11. The apparatus of claim 10 further comprising a second session deregistrator at least selectably operable subsequent to registration of the mobile node responsive to the registration request used by said second session initiator to initiate the creation of the second packet data communication session, said second session deregistrator for initiating deregistration of the mobile node out of the Internet Over The Air provisioning session that forms the second packet data communication session.

12. The apparatus of claim 11 wherein said second session deregistrator initiates deregistration of the mobile node out of the Internet Over The Air provisioning session with a deregistration request, the deregistration request for communication to the Internet Over The Air Home Agent.

13. The apparatus of claim 12 wherein the Internet Over The Air home agent, subsequent to detection of the deregistration request, deregisters the mobile node out of the Internet Over The Air provisioning session.

14. The apparatus of claim 11 further comprising an inactivity determiner, said inactivity determiner for determining inactivity of communications pursuant to the Internet Over The Air provisioning session.

15. In a method for communicating in a packet radio communication system that provides for roaming operation of a mobile node during a first packet data communication session, an improvement of a method for facilitating creation of a second packet data communication session at least during a selected time interval concurrent with the first packet data communication session, said method comprising:
- initiating, at least during the first packet data communication session, the second packet data communication session initiated with generation of a registration request that requests registration of the mobile node to communicate pursuant to the second packet data communication session;
- communicating second packet-session packet data communication session at least during the selected time interval concurrent with the first packet data communication session; and
- storing provisioning indicia at the mobile node in response to initiation of the second packet data communication session, the provisioning indicia including authentication information for use in subsequent initiation of communication pursuant to the second packet data communication session.

16. The method of claim 15 further comprising the operation of requesting initiation of the second packet data communication session and wherein said operation of initiating is performed responsive to request generated during said operation of requesting.

17. The method of claim 15 wherein the second packet data communication session comprises an Internet Over The Air (IOTA) provisioning session and wherein the registration request generated during said operation of initiating requests initiation of the Internet Over The Air provisioning session.

18. The method of claim 17 wherein provisioning indicia is associated with the Internet Over The Air provisioning session, and wherein said operation of communicating comprises providing the mobile node with the provisioning indicia.

19. The method of claim 18 further comprising the operation of ending the Internet Over The Air Provisioning session when the provisioning indicia is delivered to the mobile node.

20. The method of claim 17 wherein the packet radio communication system further comprises an Internet Over The Air home agent and wherein the registration request generated during said operation of initiating is sent to the Internet Over The Air home agent.

* * * * *